United States Patent [19]

Johnson

[11] 3,976,322

[45] Aug. 24, 1976

[54] SELF-ALIGNING GRAPPLE SWIVEL

[76] Inventor: Norman Allen Johnson, 5325 Tenth Ave., South Delta, British Columbia, Canada

[22] Filed: Oct. 22, 1975

[21] Appl. No.: 624,949

[52] U.S. Cl. ............................. 294/111; 294/112; 254/190 R; 212/84; 212/127; 212/129
[51] Int. Cl.² .......................................... B66C 1/28
[58] Field of Search .......... 294/111, 112, 107, 109, 294/106, 88, 118, 86, 14; 212/81, 84, 89, 127, 129, 7; 37/183 R, 184, 185, 187; 214/3, 46.24, 147 G, 92; 254/190 R

[56] References Cited
UNITED STATES PATENTS

| 3,032,322 | 5/1962 | Lawrence | 254/190 R |
| 3,082,031 | 3/1963 | Hindberg | 294/111 |
| 3,860,282 | 1/1975 | Johnson | 294/112 |

*Primary Examiner*—James B. Marbert

[57] ABSTRACT

This disclosure relates to a novel self-aligning swivel apparatus which is adapted for attaching a grapple to a manipulating means such as a log loader boom or yarding carriage. The swivel comprises upper and lower portions interconnected by pivot means to provide rotatable freedom therebetween. The upper portion is interconnected to the grapple manipulating means and the grapple is operatively connected to the lower portion in radial spaced relation from the axis of the pivot means. The pivot axis of the swivel is inclined toward the self-aligned position of the grapple with respect to the manipulating means. This position is defined as that which attains when the pivotal axis intersects a substantially vertical axis passing through the center of gravity of the grapple.

16 Claims, 10 Drawing Figures

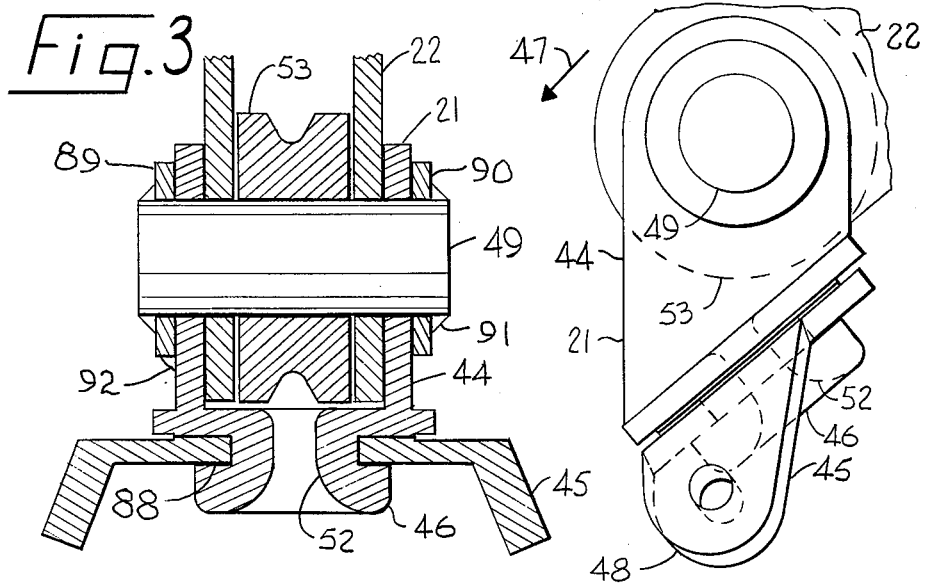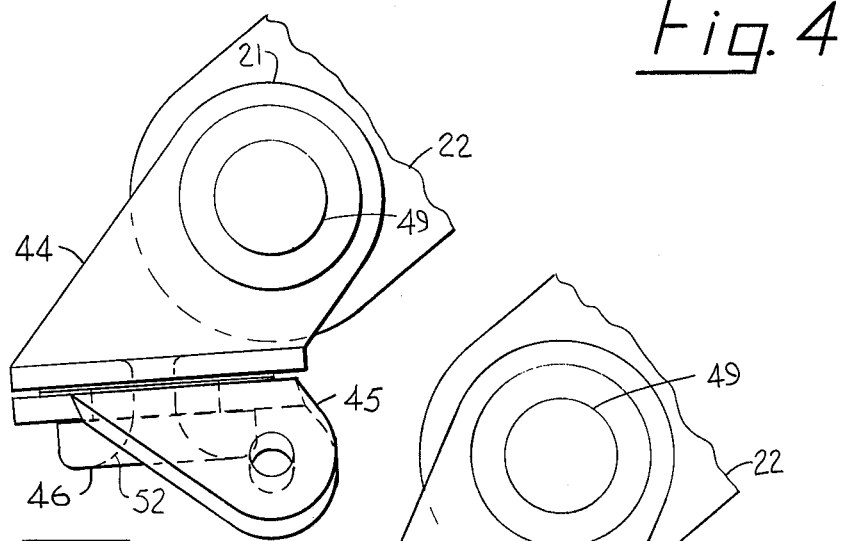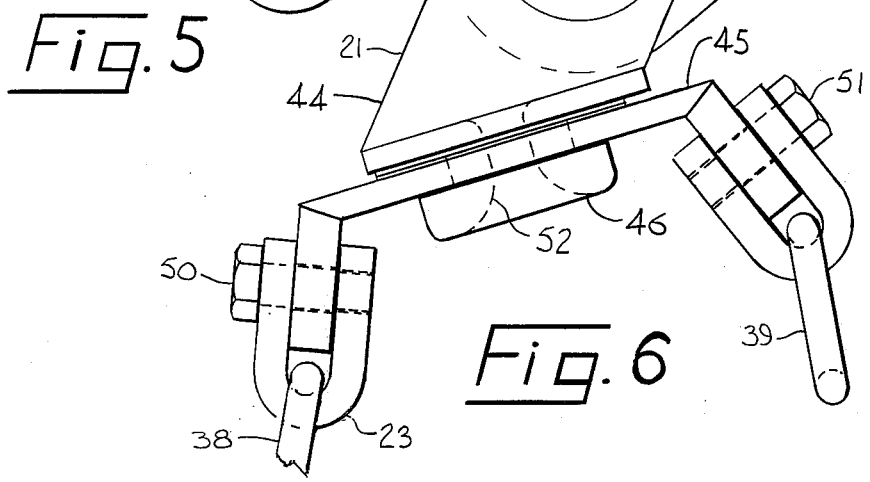

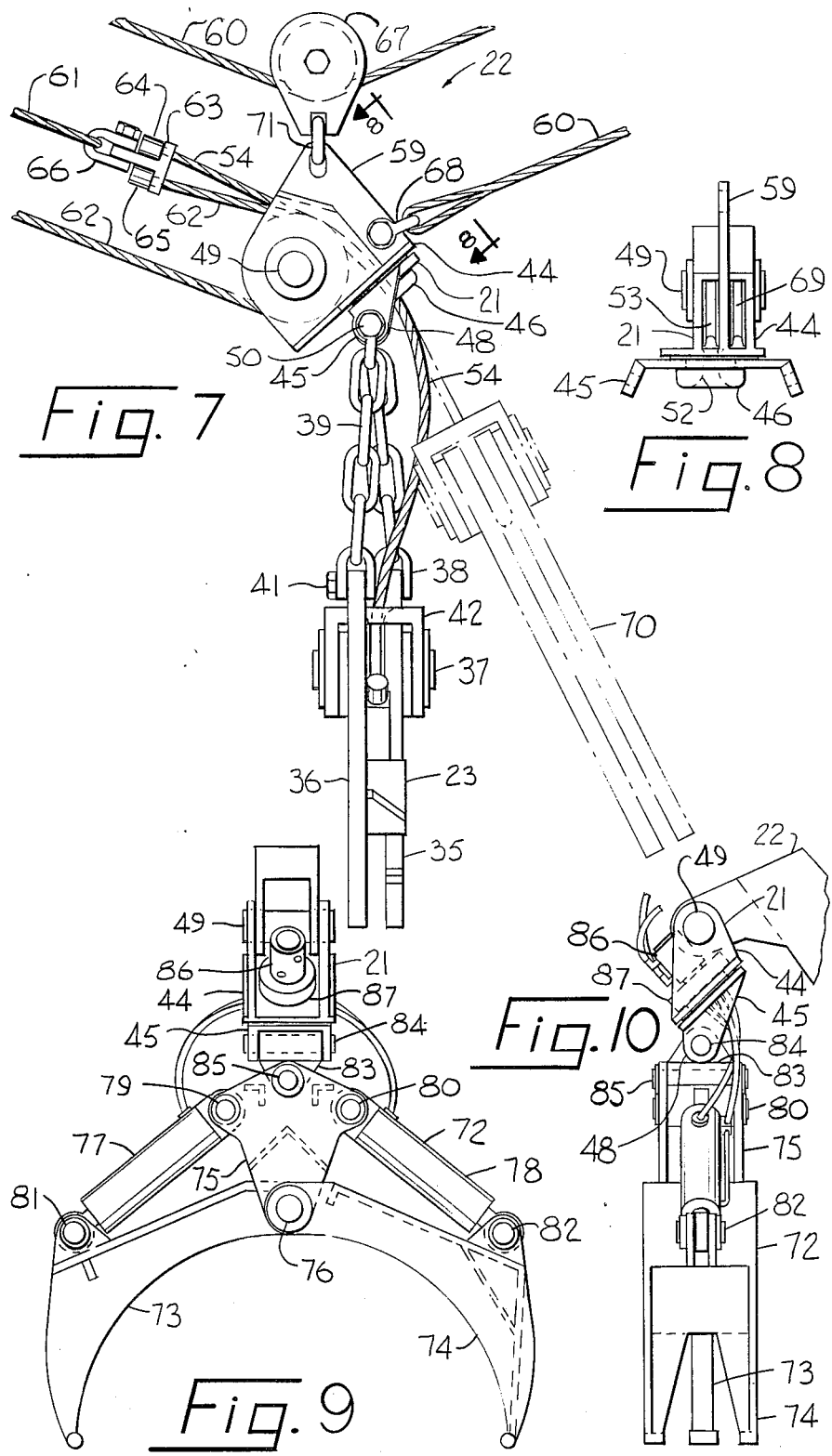

SELF-ALIGNING GRAPPLE SWIVEL

This invention relates to novel improvements in axial load bearing devices known in the art to which they pertain as swivels and grapple swivels or to other such pivotal devices having the general character of swivels. These devices normally comprise two portions interconnected on a pivotal axis for either limited or continuous angular movement of one portion with respect to the other. Specifically, the present invention is adapted for use with cable and fluid operated grapples on grapple manipulating devices such as log loader booms and racks, log skidding booms and arches, and log yarding carriages.

Log loader grapples interconnected to the end of a stick boom, knuckle boom, or heeling rack require pivotal freedom to accommodate combined angular and linear movement of a grappled log relative to the boom or rack. A conventional swivel device requires a rotary actuator to position the grapple when it becomes misaligned with respect to the loader boom or heeling rack. This is normally accomplished with a rotary actuating means providing either limited or continuous rotation. In log loaders, because a log may require turning end-for-end after it is grappled, continuous swivel rotation is preferred. The preferred aligned position of the grapple is substantially perpendicular to the boom or heeling rack.

Log skidding grapples, while normally not requiring continuous rotation with respect to the skidder, do require angular freedom to accommodate skidder cornering. The preferred aligned position of the grapple is substantially perpendicular to the line of travel of the skidder. This permits the skidder to back into the end of a turn of logs.

Log yarding grapples normally require continuous rotation to accommodate logs turning end-for-end as they are yarded. The preferred orientation of the grapple is normally apporximately 45° with respect to the cable system but depends on the falling pattern of the logs and whether one side of the grapple is suspended lower than the other.

In each of the aforementioned cases, grapple alignment may be accomplished automatically with the present invention resulting in economies in weight, cost, and mechanical complexity. The self-aligning grapple swivel may be adapted to provide either one preferred position, as in the case of loader or skidder grapples, or two equivalent preferred positions, as in the case of yarding grapples.

Accordingly, one object of the present invention is to provide a swivel apparatus adapted for interconnecting a grapple to a manipulating means, one portion of the swivel assuming a preferred self-aligned position with respect to the other when the grapple is freely suspended therefrom.

Another object of this invention is to provide a self-aligning swivel apparatus adapted for interconnecting a cable operated grapple to a manipulating means, wherein a cable guide means or cable fairlead means is incorporated in the pivotal interconnection between two portions of the swivel.

Yet another object of the present invention is to provide a self-aligning swivel apparatus adapted for interconnecting a cable-closed grapple to a manipulator means, wherein the cable passes throgh a cable fairlead means incorporated in the pivotal interconnection between two portions of the swivel, a grappled load being borne substantially by the cable, the swivel interconnection being required to bear only the weight of the empty grapple.

Still another object of this invention is to provide a self-aligning swivel apparatus adapted for interconnecting a fluid operated grapple to a manipulating means, rotary union means being incorporated in the pivotal interconnection between two portions of the swivel, whereby fluid is transferable between the grapple and manipulating means in all positions of the grapple with respect to the manipulating means.

A further object of the present invention is to provide a self-aligning swivel apparatus adapted for interconnecting either cable or fluid operated grapples to log loaders, booms and heeling racks, log skidder booms and arches, and log yarding carriages.

Another object of this invention is to provide a self-aligning swivel apparatus the upper portion of which is pivotally interconnected to a manipulating means and the lower portion is pivotally interconnected to a grapple, the upper interconnection being spaced a substantially greater distance from the swivel axis than the lower interconnection, whereby the swivel has one preferred self-aligned position.

Still another object of this invention is to provide a self-aligning swivel apparatus the upper portion of which is pivotally interconnected to a manipulating means and the lower portion is pivotally interconnected to a manipulating means and the lower portion is pivotally interconnected to a grapple, the lower interconnection being spaced a substantially greater distance from the swivel axis than the upper interconnection, whereby the swivel has two preferred self-aligned positions.

Another object of the present invention is to provide a self-aligning swivel apparatus adapted for interconnecting a cable closed grapple to a log loader heeling rack, the upper portion of the swivel including cable entrainment means, the swivel pivot including cable fairlead means, and the heeling rack including line shortener means.

These and still further objects and advantages of the present invention reside in the details of construction of a preferred embodiment disclosed herein and will be evident to one skilled in the art from a study of the specification and accompanying drawings. Therefore, the preferred embodiment disclosed is merely exemplary and is not intended to detract from the full scope of the invention as set out in the annexed claims.

In the drawings, wherein like numerals refer to like parts:

FIG. 3 is a sectional view of the invention taken along line 3—3 in FIG. 1;

FIG. 4 is an enlarged side view of the invention in its self-aligned position as taken along line 4—4 in FIG. 2;

FIG. 5 is a side view of the invention in an unstable position, the lower portion of which is rotated approximately 180° from its self-aligned position;

FIG. 6 is a side view of the invention in an unstable position, the lower portion of which is rotated approximately 90° from its self-aligned position;

FIG. 7 is a side view of the present invention adapted for use on a grapple yarding carriage;

FIG. 8 is an end view of a grappling yarding carriage taken along line 8—8 in FIG. 7;

FIG. 9 is a front view of this invention adapted for use with a fluid operated grapple;

FIG. 10 is a side view of the combination as illustrated in FIG. 9.

Figure 1:
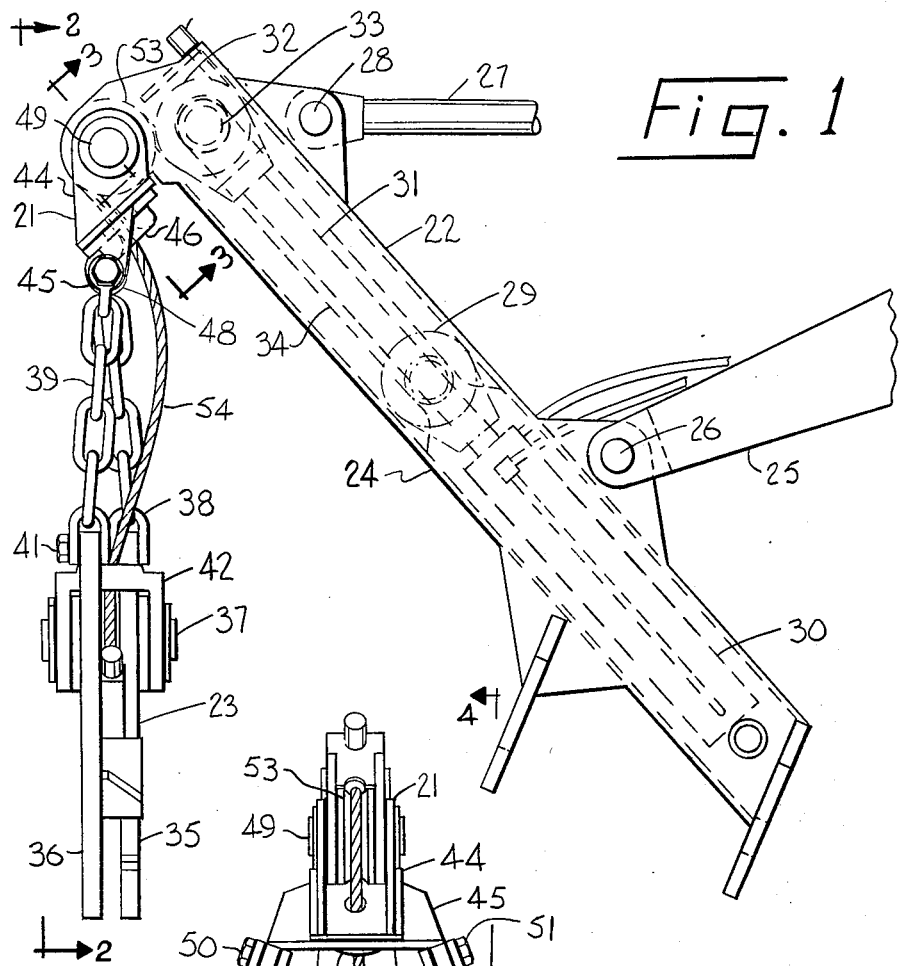
FIG. 1 is a slide view of the present invention in combination with a log loader heeling rack and a cable closed log grapple.
Figure 2:
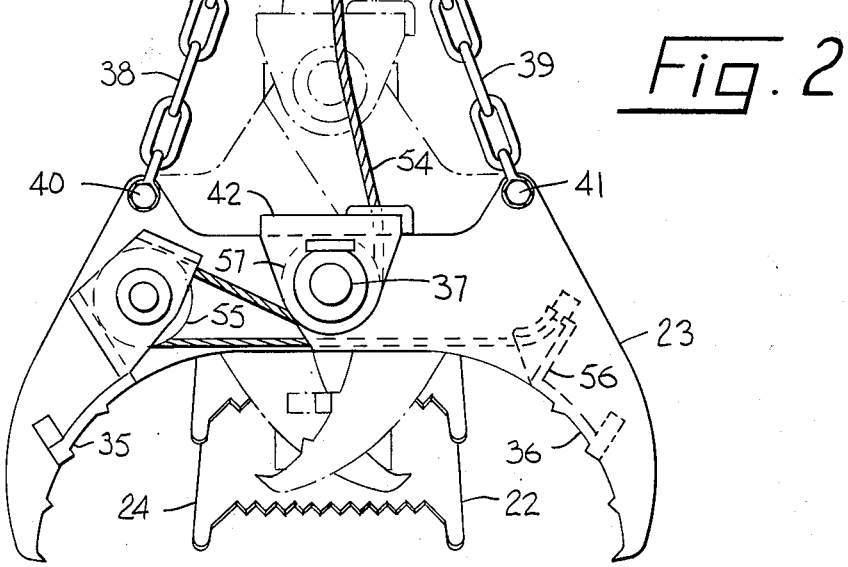
FIG. 2 is a front view of this invention taken along line 2—2 in FIG. 1.

Referring now to the drawings, FIGS. 1 and 2 illustrated side and front views of a self-aligning swivel apparatus 21 in combination with a manipulating means 22 and grapple 23.

Manipulating means 22 comprises a typical log loader heeling rack 24 interconnected to boom extension 25 by pin means 26 and rack cylinder rod 27 by pin means 28. Included in heeling rack 24, for actuation of grapple 23, line shortener means 29 comprising fluid linear actuator 30, having rod 31 interconnected to sheave means 32 by pin means 33, and sheave guide means 34. Extension of rod 31 opens and retraction closes grapple 23.

Grapple 23 comprises a pair of jaws 35 and 36 pivotally interconnected at their upper ends by pin means 37, a pair of opening members 38 and 39 interconnected to the jaws by pin means 40 and 41, swivel guide means 42 pivotally mounted on pin means 37, sheave means 55 mounted on jaw 35, and dead-end means 56 mounted on jaw 36. Sheave means 57 is rotatably mounted on pin means 37.

Referring further to FIGS. 3, 4, 5 and 6, self-aligning swivel 21 comprises upper portion 44 and lower portion 45 pivotally interconnected by pivot means 46 having a pivotal axis inclined in direction 47 toward a self-aligned position 48 of lower portion 45 with respect to upper portion 44. Upper portion 44 is pivotally interconnected to rack 24 by pin means 49 on an axis lying in a plane substantially perpendicular to the pivotal axis of pivot means 46. Grapple opening members 38 and 39 are interconnected by pin means 50 and 51 on axes lying in planes substantially perpendicular to the pivotal axis of pivot means 46; it will be apparent to one skilled in this art that pins 50 and 51 could share a common axis, the slight skew illustrated being provided to accommodate the angle of attachment of opening members 38 and 39 to lower portion 45. The axis of pin means 49 is spaced a greater distance from the axis of pivot means 46 than are the axes of pins 50 and 51; this relationship between pins 49, 50 and 51 ensures that the axis of pivot means 46 is always inclined toward self-aligned position 48. Pivot means 46 includes cable guide means 52 substantially concentric with its pivotal axis. Sheave means 53 is rotatably mounted on pin means 49. Grapple closing cable 54 is secured to grapple dead-end means 56 and entrained about sheave means 55 and 57, passes through cable guide 52, is entrained about sheave means 53 and 32 and secured to rack 24 by ferrule 58.

From FIG. 3 it will be noted that pivot means 46 is structurally intergrated with upper portion 44. Lower portion 45 pivots on bearing surface 88, and sheave means 53 bears on pin means 49. Pin means 49 is secured axially by washers 89 and 90 and welds 91. One of washers 89 and 90 should be secured to upper portion 44 by a tack weld 92 or by a bolt to prevent rotation of pin means 49 with sheave means 53. It will be evident to one skilled in this art that a choice of bearing types and materials, along with details of construction and assembly, will be a matter of design for any particular use of my invention. It should be noted, however, that lower portion 45 should be sufficiently free on pivot means 46 to permit self-alignment of lower portion 45 with respect to upper portion 44, given the grapple weight, lubrication type and method, and alignment inducing inertia forces attending movement of manipulating means 22.

Turning now to the operation of the present invention, it will be apparent from FIGS. 1 and 2 that the self-aligned open position of grapple 23 is substantially at right angles to a plane parallel with the extended length of rack 24. In this position, pins 50 and 51 are at their greatest distance from pin 49, the axis of pivot means 46 is inclined toward self-aligned position 48 of lower portion 45 at its maximum angle measured from a vertical axis passing through the axis of pin means 49, and a substantially vertical axis passing through the center of gravity of grapple 23 intersects the axes of pivot means 46 and pin means 49, 50, and 51. This position is substantially stable inasmuch as small inertia or other forces may cause grapple 23 to oscillate about its stable position with respect to the pivotal axis of pivot means 46. FIG. 5 illustrates a position of lower portion 45 with respect to upper portion 46 which is unstable; a slight movement of manipulating means 22 will create an inertia force in grapple 23 which will apply a moment about pivot 46 to lower portion 45. Once movement of lower portion 45 with respect to upper portion 44 has been initiated, it will continue through the relative position illustrated in FIG. 6 to the self-aligned position illustrated in FIG. 4.

Retraction of line-shortener cylinder rod 31 takes in cable 54 thus closing grapple 23 on a log or logs until opening members 38 and 39 become slack. The grappled load is then supported by cable 54 and pin 49, not by swivel parts 44, 45, and 46. The swivel pivots slightly to align cable guide 52 with cable 54. If a log is picked up at the wrong end for loading, it must be up-ended, or turned end-for-end, with the grapple in place. When this happens, lower portion 45 turns freely about the axis of pivot means 46 while the grapple pivots substantially about cable 54. Once the up-ended log is loaded, lower portion 45 is in the position illustrated in FIG. 5; swinging the loader boom 25 away from the loaded log, about the swing axis of a loading machine, creates an angular inertia moment in grapple 23 which returns it to self-aligned position 48.

FIGS. 7 and 8 illustrate the present invention wherein the manipulating means comprises a grapple yarding carriage 59 and cable yarding system employing haulback line 60, first mainline 61 and second mainline 62. Cable 54 is interconnected to mainlines 61 and 62 by tee-bar 63, ferrules 64 and 65, and shackle 66. Carriage 59 is supported partially by block 67 riding on haulback line 60. Haulback line 60 is secured to carriage 59 by shackle 68. Mainline 62 is entrained about sheave 69 rotatably mounted on pin 49. Yarding in a loaded grapple will align cable 54 substantially with cable guide 52 and indicated by grapple position 70. It will be noted that the location of interconnection 71 of block 67 and shackle 68 to carriage 59, relative to the axis of pivot means 46, will have some bearing on the angle of inclination of the axis of pivot means 46 in relation to up-hill, level, and down-hill yarding. It should also be noted that flexibility of the cable system permits the grapple to attain either of two substantially stable positions slightly out of perpendicular to the plane of the cable system; that is to say the axis of pin 49 will rotate slightly clockwise or counter clockwise in a substantially vertical plane, depending on the direction of rotation of lower portion 45.

FIGS. 9 and 10 illustrate a preferred embodiment of the present invention in which the grapple 72 is fluid actuated. This grapple comprises jaws 73 and 74 and pivot head 75 pivotally mounted on pivot pin 76, and a pair of linear actuators 77 and 78 pivotally connected to head 75 by pins 79 and 80 and to jaws 73 and 74 by pins 81 and 82. Lower portion 45 is pivotally interconnected to swivel adapter 83 by pin 84 and head 75 is interconnected to adapter 83 by pin 85. Pins 84 and 85 have substantially perpendicular axes lying in spaced parallel planes. Instead of cable guide means 52, pivot means 46 includes a conventional rotary union means 86 whereby actuating fluid is transmitted to and from grapple 72 in all angular positions of the grapple relative to rack 24. In addition, pivot means 87 is in this case an integral part of lower portion 45. In the case of this grapple, as well as that of a cable opening grapple, it is clear that the swivel must bear the grappled load as well as the weight of the grapple in all positions of the grapple relative to rack 24.

It is believed that my invention of a self-aligning grapple swivel will have been clearly understood from the foregoing detailed description of my now preferred and illustrated embodiment. Various modifications, changes, additions, and equivalents may be resorted to in view of these teachings by one skilled in this art without departing from the spirit of my invention. For instance, the angular motion of lower portion 45 with respect to upper portion 44 may be limited to substantially less than 360° by stop means secured to upper portion 44 and interacting with lower portion 45. Pivot means 46 may include anti-friction bearings. Upper portion 44 may be mounted on rack 24 by swivel adapter means equivalent to element 83 in FIGS. 9 and 10 where two self-sligned positions are required. Line-shortener means 29 could be a winch instead of a linear actuator. The grapple may be cable opened and gravity closed. Cable guide means 52 may include rollers. Pivot means 46 may be an integral structural part of lower portion 45. Therefore, the present invention is not to be construed as limited to the specific details illustrated and described above, and whereas a choice between variations, modifications, changes, additions, and equivalents falling within the true scope of my invention will depend largely upon the circumstances in which it is used, it is my express intention that no limitations be implied and that the hereto annexed claims be given the broadest interpretation which the language fairly admits.

The embodiments of the invention in which an exclusive property or privilege is claimed are defined as follows:

1. In combination with a grapple and manipulating means, a self-aligning swivel apparatus having upper and lower portions interconnected for relative angular motion by pivot means having a pivotal axis, said pivotal axis inclined toward a self-aligned position of said grapple with respect to said manipulating means, said upper portion interconnected to said manipulating means, said grapple interconnected to said lower portion in radial spaced relation from said pivotal axis, a substantially vertical axis passing through the center of gravity of said grapple intersecting said pivotal axis when said grapple is in said self-aligned position.

2. The combination of claim 1, wherein said relative angular motion of said upper and lower portions is limited by stop means, said pivotal axis inclined toward said self-aligned position in all angular positions of said lower portion with respect to said upper portion.

3. The combination of claim 1, wherein said upper portion is pivotally interconnected to said manipulating means and said grapple is pivotally interconnected to said lower portion respectively on first and second axes in spaced relation from and lying in planes substantially perpendicular to said pivotal axis, said first axis being spaced a substantially greater distance from said pivotal axis than said second axis, said first and second axes being substantially parallel in said self-aligned position.

4. The combination of claim 1, wherein said relative angular motion of said upper and lower portions is rotatable, said pivotal axis inclined toward said self-aligned position in all angular positions of said lower portion with respect to said upper portion.

5. The combination of claim 1, wherein said manipulating means comprises a log yarding grapple carriage suspended from a cable yarding system, said upper portion comprising an integral portion of said grapple carriage.

6. The combination of claim 1, wherein said manipulating means comprises a heeling rack on a log loader boom.

7. The combination of claim 1, wherein said manipulating means comprises a log stick boom on a log loader.

8. The combination of claim 1, wherein said manipulating means comprises a boom means on a log skidding apparatus.

9. The combination of claim 1 wherein said lower portion includes swivel adapter means.

10. The combination of claim 1 wherein said upper portion includes swivel adapter means.

11. The combination of claim 1, wherein said grapple is fluid actuated, said pivotal means including rotary union means whereby fluid is transferred between said grapple and said manipulating means.

12. The combination of claim 1, wherein said grapple is cable operated, said upper portion including cable entrainment means, said pivot means including cable fairlead means through which passes a grapple operating cable means interconnecting said grapple and said manipulating means.

13. The combination of claim 1, wherein said grapple is cable operated, said upper portion including pin means, sheave means rotatably mounted on said pin means, said pivot means including cable guide means, said manipulating means including line-shortener means, cable means operatively connected to said grapple and said line-shortener means and passing through said cable guide means and entrained about said sheave means.

14. The combination of claim 1, wherein said grapple is closed by a cable and opened by a pair of opening members, said upper portion including pin means, sheave means rotatably mounted on said pin means, said pivot means including cable fairlead means, said cable operatively connected to said grapple and passing through said fairlead means and entrained about said sheave means, said opening members operatively connected to said lower portion, whereby paying out of said cable from said manipulating means opens said grapple and taking in of said cable closes said grapple, a grappled load substantially being borne by said cable and said pin means.

15. The combination of claim 1, wherein said upper portion is pivotally interconnected to said manipulating means and said grapple is pivotally interconnected to said lower portion respectively in first and second axes lying in planes substantially perpendicular to said pivotal axis, said second axis being spaced a substantially greater distance from said pivotal axis than said first axis, said first and second axes being substantially parallel in each of two self-aligned positions.

16. In combination with a grapple and manipulating means, a self-aligning swivel apparatus having upper and lower portions interconnected for relative angular motion by pivot means having a pivotal axis, said pivotal axis inclined toward a self-aligned position of said grapple with respect to said manipulating means, said grapple being closed by a cable and opened by a pair of opening members, said manipulating means including line-shortener means, said upper portion pivotally mounted on said manipulating means by pin means, said grapple opening members operatively connected to said lower portion, said pivot means having cable guide means substantially concentric with said pivotal axis, said cable operatively connected to said grapple and passing through said cable guide means and entrained about said pin means and operatively connected to said line-shortener means, a substantially vertical axis passing through the center of gravity of said grapple intersecting said pivotal axis when said grapple is suspended open and in said self-aligned position.

* * * * *